United States Patent
Johansson (10) Patent No.: US 7,672,392 B2
(45) Date of Patent: Mar. 2, 2010

(54) ARRANGEMENTS AND METHODS FOR A DIGITAL COMMUNICATION SYSTEM

(75) Inventor: Magnus Johansson, Timmermansgatan (SE)

(73) Assignee: Ericsson AB, Kista (SE)

( * ) Notice: Subject to any disclaimer, the term of this patent is extended or adjusted under 35 U.S.C. 154(b) by 895 days.

(21) Appl. No.: 10/549,449

(22) PCT Filed: Mar. 12, 2004

(86) PCT No.: PCT/SE2004/000363

§ 371 (c)(1),
(2), (4) Date: Jul. 19, 2006

(87) PCT Pub. No.: WO2004/082230

PCT Pub. Date: Sep. 23, 2004

(65) Prior Publication Data

US 2006/0262873 A1    Nov. 23, 2006

Related U.S. Application Data

(60) Provisional application No. 60/454,309, filed on Mar. 14, 2003.

(30) Foreign Application Priority Data

Mar. 14, 2003   (SE) ..................... 0300695

(51) Int. Cl.
*H03D 5/00* (2006.01)

(52) U.S. Cl. ..................... 375/269; 332/120

(58) Field of Classification Search ............... 375/269; 332/120
See application file for complete search history.

(56) References Cited

U.S. PATENT DOCUMENTS

| | | | |
|---|---|---|---|
| 6,477,200 B1 * | 11/2002 | Agazzi et al. | 375/233 |
| 6,553,535 B1 * | 4/2003 | Asada et al. | 714/777 |
| 6,567,473 B1 * | 5/2003 | Tzannes | 375/260 |
| 6,667,991 B1 * | 12/2003 | Tzannes | 370/465 |
| 6,731,695 B2 * | 5/2004 | Tzannes et al. | 375/298 |
| 6,934,317 B1 * | 8/2005 | Dent | 375/140 |
| 6,937,617 B2 * | 8/2005 | Rakib et al. | 370/485 |
| 2002/0196861 A1 | 12/2002 | Tzannes et al. | |
| 2005/0074074 A1 * | 4/2005 | Limberg | 375/285 |

FOREIGN PATENT DOCUMENTS

| | | |
|---|---|---|
| EP | 1128623 | 8/2001 |
| EP | 1199858 | 4/2002 |
| EP | 1248426 | 10/2002 |
| WO | WO 0176118 | 10/2001 |

* cited by examiner

*Primary Examiner*—Juan A Torres
(74) *Attorney, Agent, or Firm*—Young & Thompson (57) ABSTRACT

Methods, computer-readable medium, a transmitter, a receiver and a transceiver include the transmitter and the receiver in a digital communication system for reducing the transmit power level when there is no user data is to send, i.e., when dummy data is sent instead. That is achieved by defining a symbol alphabet Q and scrambling a modulated bit stream including user data and dummy data with randomly generated symbols from the symbol alphabet Q.

29 Claims, 7 Drawing Sheets

ARRANGEMENTS AND METHODS FOR A DIGITAL COMMUNICATION SYSTEM

FIELD OF THE INVENTION

The present invention relates to methods and arrangements in a digital communications system, and more particularly, to automatic transmit power reduction for multilevel digital communication.

BACKGROUND OF THE INVENTION

Figures 1, 2:
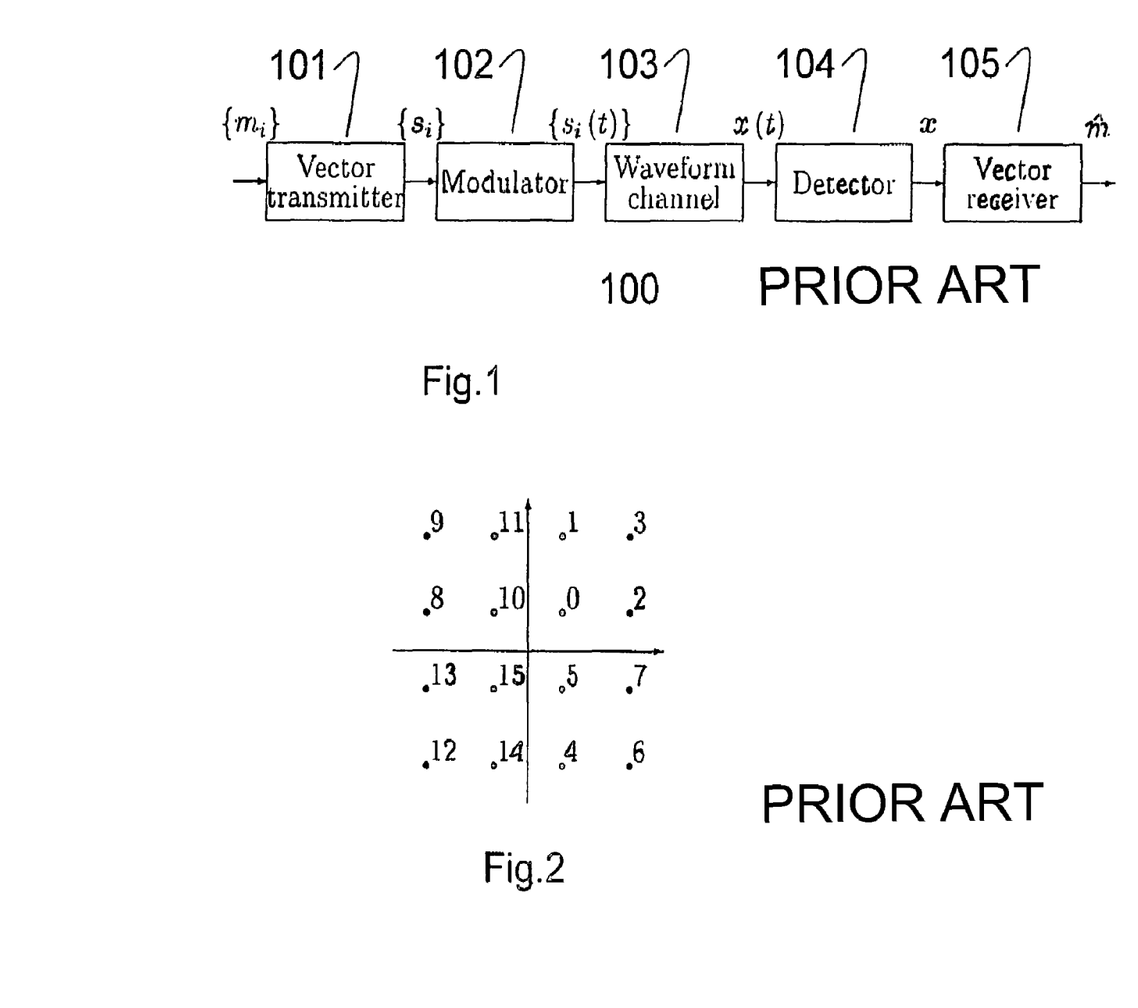
FIG. 1 is a schematic block diagram illustrating a digital communication system.
FIG. 2 illustrates an example of 16-QAM with one out of many possible numbering schemes.

A digital communication system 100 can be modelled as illustrated in FIG. 1. Data information is modulated to message symbols $m_i$ taken from a symbol alphabet $M=\{m_0, m_1, \ldots, m_{M-1}\}$. One common multilevel modulation method is Quadrature Amplitude Modulation (QAM). A digital transmitter based on QAM maps data onto a 2-dimensional (N=2) coordinate system of orthogonal base vectors. FIG. 2 shows an example of 16-QAM (M has 16 elements) with one out of many possible numbering schemes. The message symbols are converted into vectors of real numbers, $$s_i = \begin{Bmatrix} s_{i0} \\ s_{i1} \\ \ldots \\ s_{iN-1} \end{Bmatrix}$$

where the dimension is $N \leq M$, by a vector transmitter 101. A modulator 102 constructs a signal $S_i(t)$ which is sent over a channel 103. The channel affects the signal $s_i(t)$ and creates a signal $x(t)$. A detector 104 receives the signal $x(t)$, demodulates the signal and constructs an observation vector x. The observation vector is decoded by a vector receiver 105 producing an estimate $\hat{m}$ of the symbol being sent.

Digital communication requires that there exist a method for synchronizing the receiver to the transmitter in order to decode the data correctly. The channel over which the communication takes place normally also introduces a linear transformation of the signal, which leads to the requirement of an equalization method. Synchronization and equalization methods vary between different communication systems, however, the methods are often developed under the assumption that the transmitted data is randomized in some way, usually by scrambling the data prior to modulation with a pseudo-noise sequence that is also known at the receiver. The scrambler ensures that even if the incoming data consists of long sequences of constant patterns, the data over the channel is randomized. One particular situation where long sequences of constant patterns normally occurs in the data stream is when there is no user data, i.e., the transmitter has to fill the data channel with dummy data. The scrambling ensures that the power level on the channel is approximately constant regardless of the data content user data or dummy data. The average energy per modulation interval is $$E_{av} = \frac{1}{\|M\|} \sum_{i=0}^{\|M\|-1} E_i = \quad (1)$$

where $E_i$ is the energy level for a particular constellation point and $\|M\|$ is the size of the symbol alphabet which is equal to the number of constellation points.

In contrast, in several applications, such as Very high data rate Digital Subscriber Line (VDSL) system, there would be desirable to be able to transmit with a lower power when there is no user data to be sent. Depending on the type of application, this can result in reduced crosstalk, reduced radio frequency interference, and/or reduced power consumption in line driver circuitry.

Existing solutions require that the transmitter and receiver agrees upon entering a special power reduction mode when the transmitter predicts that user data will be absent for some period of time. A multi-carrier specific solution is disclosed in EP 883269 A1.

However, it is often difficult to predict the behaviour of user data. Entering and leaving a special power reduction mode requires communication between the transmitter and receiver and is therefore time consuming. The period of time that user data will be absent must be longer than the time it takes to reach an agreement between transmitter and receiver. During the power reduction mode, the transmitter and receiver are still connected, but a transition to the power reduction mode implies that the transmitter performs the following in order to reach the agreement with the receiver:

The transmitter requires information if no data will be transmitted in the immediate future. This information is often based on measurements and assumptions.
Determine the exact point of time for the transition into the power reduction mode and communicate the point of time to the receiver.
Receive an acknowledgement from the receiver.
A transition from the power reduction mode implies that the transmitter performs the following:
Determine an exact point of time for the transition from the power reduction mode and communicate the point of time to the receiver.
Receive an acknowledgement from the receiver.
Therefore, these solutions do not work when user data and dummy data are heavily interleaved. Entering and leaving the power reduction mode also leads to communication overhead in terms of an increased signalling.

It is also desirable that the values of the dummy data is randomized in order to avoid e.g. major peaks in the output signal.

SUMMARY OF THE INVENTION

An object of the present invention is to provide methods and arrangements for reducing transmit power when no user data is transmitted according to embodiments of the present invention.

The method according to the present invention makes it possible to reduce transmit power when no user data is transmitted. The method comprises the steps of generating symbols randomly from a predefined symbol alphabet Q that is a subset of a symbol alphabet M, scrambling a bit stream that is represented by symbols from symbol alphabet M by performing bitwise modulo-2 addition between the modulated bit stream and the randomly generated symbols from Q, and transmitting said scrambled bit stream. The predefined symbol alphabet Q is defined so that the transmit power level of the dummy data is substantially lower than the transmit power level of the user data.

The method according to the present invention, comprising the steps of generating symbols randomly from the symbol alphabet Q in synchronisation with the transmitter of the received bit stream and scrambling the received bit stream in order to recreate estimated message symbols from symbol alphabet M by performing bitwise modulo-2 addition between the received bit stream and the randomly generated symbols from Q, makes it possible to reduce transmit power when no user data is transmitted.

The computer program product directly loadable into the internal memory of a computer within a receiver or transmitter in a digital communication system according to the present invention, comprising the software code portions for performing the steps of said methods, makes it possible to reduce transmit power when no user data is transmitted.

The computer program product stored on a computer usable medium, comprising readable program for causing a computer, within a receiver or transmitter in a digital communication system, to control an execution of the steps of said methods according to the present invention, makes it possible to reduce transmit power when no user data is transmitted.

The transmitter according to the present invention makes it possible to reduce transmit power when no user data is transmitted. The transmitter comprises means for transmitting a modulated bit stream comprising user data and dummy data, wherein the modulated user data is represented by symbols from a symbol alphabet M, the modulated dummy data is represented by a symbol $m_0$. The transmitter further comprises means for generating symbols randomly from a predefined symbol alphabet Q being a subset of M, means for scrambling the bit stream by performing bitwise modulo-2 addition between the modulated bit stream and the randomly generated symbols from Q, and means for transmitting said scrambled bit stream. The predefined symbol alphabet Q is defined so that the transmit power level of the dummy data is substantially lower than the transmit power level of the user data.

The receiver according the present invention makes it possible to reduce transmit power when no user data is transmitted. The receiver comprises means for receiving a bit stream wherein the bit stream is transmitted and scrambled by said transmitter. The receiver further comprises means for in synchronisation with the transmitter of the received bit stream generating symbols randomly from the symbol alphabet Q and means for scrambling the received bit stream by performing bitwise modulo-2 addition between the received bit stream and the randomly generated symbol from Q in order to recreate estimated message symbols from symbol alphabet M.

The transceiver according to the present invention, comprising said transmitter and said receiver, makes it possible to reduce transmit power when no user data is transmitted.

An advantage with the method of the present invention is that it is automatic and that the power reduction is instantaneous and does not result in communication overhead.

A further advantage is that the method of the present invention does not dictate the type of multilevel coding (QAM etc.) or the data protocol being used (ATM, VDSL, HDLC etc.). Furthermore, it works with single-carrier systems as well as with multi-carrier systems. It can also coexist with other methods such as the method disclosed in EP 883269.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 3:
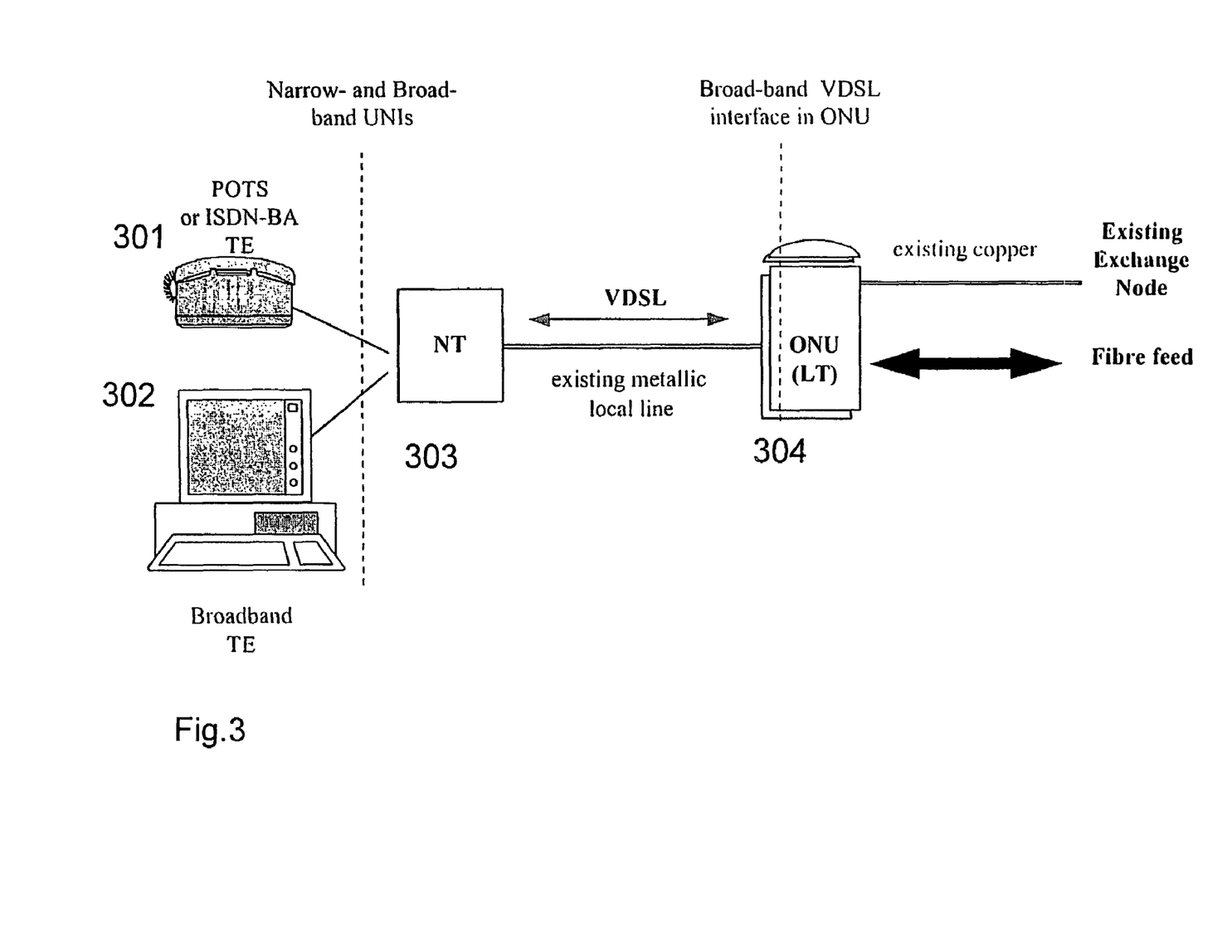
FIG. 3 is a schematic block diagram illustrating a network where the present invention may be implemented.

The method according to the present invention is preferably implemented in a transceiver 303, 304 in a digital telecommunication system as illustrated in FIG. 3. The digital telecommunication system may be a Digital Subscriber Line (DSL) system such as a Very high data rate (V)DSL or an Asymetrical (A)DSL system. Asynchronous Transfer Mode (ATM) and an octet based High Level Data Link Control (HDLC) are examples of protocols that can be used in said systems.

The transceiver in accordance with the present invention comprises a transmitter and a receiver. The transceivers may be located within a network terminal (NT) 303, e.g. a VDSL data modem and in an optical network unit (ONU) 304 in e.g. a VDSL network. The NT 303 and the ONU 304 are connected and communicate by using a protocol such as VDSL or ADSL. The NT 303 is further connected to various terminal equipments 301, 302 such as broadband terminals or Plain Old telephone System-(POTS) or Integrated Service Digital Network-Basic Access (ISDN-BA)-terminals. The ONU 304 is connected to the remaining network.

The methods and arrangements in accordance with the present invention will hereinafter be described in a system where QAM is used as modulation technique. However, for a man skilled in the art it will be apparent that the present invention may be implemented with other multi-level modulation techniques such as Pulse Amplitude Modulation (PAM).

Figure 4A:
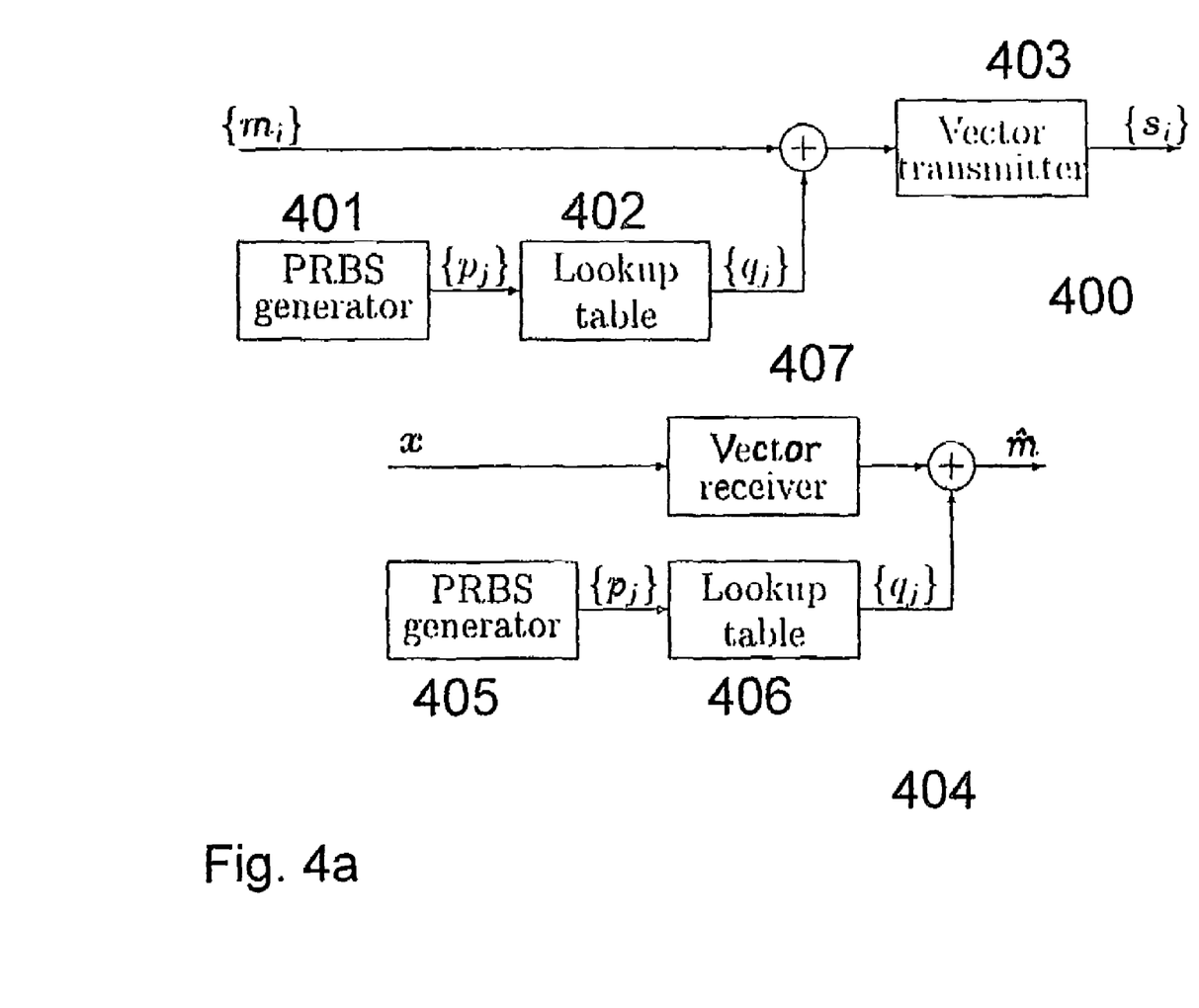
FIG. 4a is a schematic block diagram illustrating a transmitter and a receiver using bitwise modulo-2 addition wherein $m_0=0$ in accordance with a first preferred embodiment of the present invention.

FIG. 4a illustrates a transmitter 400 and a receiver 404 in accordance with a first preferred embodiment of the present invention. The transmitter 400 is adapted to transmit a modulated bit stream $m_0 \ldots m_{M-1}$. The bit stream is modulated by a modulator (not shown in FIG. 4a) in accordance with a multi-level modulation technique such as 16-QAM. The bit stream comprises user data and dummy data. When the transmitter is in connection with the receiver, the bit stream is sent from the transmitter to the receiver. The dummy data is sent when there is no user data to transmit. The modulated bit stream is represented by a symbol alphabet M comprising the symbols $m_0 \ldots m_{M-1}$, wherein the dummy data is represented by the symbol $m_0$. The transmitter comprises a vector transmitter 403 that converts message symbols $m_0 \ldots m_{M-1}$ as shown in FIG. 2 into vectors of real numbers and a modulator. In the first preferred embodiment of the present invention as shown in FIG. 4a, the bit stream is scrambled by randomly generated symbols from a predefined symbol alphabet Q before it is converted by the vector transmitter. A Pseudo-Random Binary Sequence (PRBS) generator 401 randomly generates symbols $q_0 \ldots q_{k-1}$ from the alphabet Q stored in a lookup table 402, wherein k<M. The randomly generated symbols are then scrambled with the bit stream by a bitwise modulo-2 addition between each of the bits of the bit stream and a randomly generated symbol of Q. The scrambling of the bit stream, comprising user data and dummy data, results in that the power of the dummy data is substantially lower than the power of the user data. The bitwise modulo-2 addition is defined as

| A | B | A + B |
|---|---|-------|
| 0 | 0 | 0 |
| 0 | 1 | 1 |
| 1 | 0 | 1 |
| 1 | 1 | 0 |

The receiver 404 is adapted to receive the scrambled modulated vector transmitted by the transmitter 400. The scrambled modulated vector is affected by the waveform of the used channel. The receiver 404 comprises a detector (not shown in FIG. 4a) that recreates a vector corresponding to the transmitted vector by correlating the received vector with a function equal to the expected vector. The receiver 404 further comprises a vector receiver 407. The vector receiver 407 reconverts the received vector into message symbols $q_0 \ldots q_{k-1}$, i.e. it determines which of the message points $q_0 \ldots q_{k-1}$ that is closest to the detected and recreated vector. Thus, a modulated bit stream $q_0 \ldots q_{k-1}$ is recreated. It should, however, be noted that the vector receiver receives the entire M, and not only the subset Q.

In the first embodiment of the present invention, the signal determined by the vector receiver is scrambled by randomly generated symbols from the predefined symbol alphabet Q. A PRBS generator 405 synchronized with a PRBS generator 401 of the transmitter randomly generates symbols from the alphabet Q stored in the lookup table 406. The bit stream is then scrambled with the randomly generated symbol by a bitwise modulo-2 addition in order to recreate the estimated message symbols $\hat{m}_0, \ldots \hat{m}_{N-1}$, The scrambling of the bit stream with the power reduction subset Q differs from the scrambling used in the prior art in that Q is, in accordance with the present invention, selected so that the dummy data in the data stream gives a desired power reduction. I.e. the power of the scrambled dummy data is substantially less than the power of the scrambled user data.

Figure 5A:
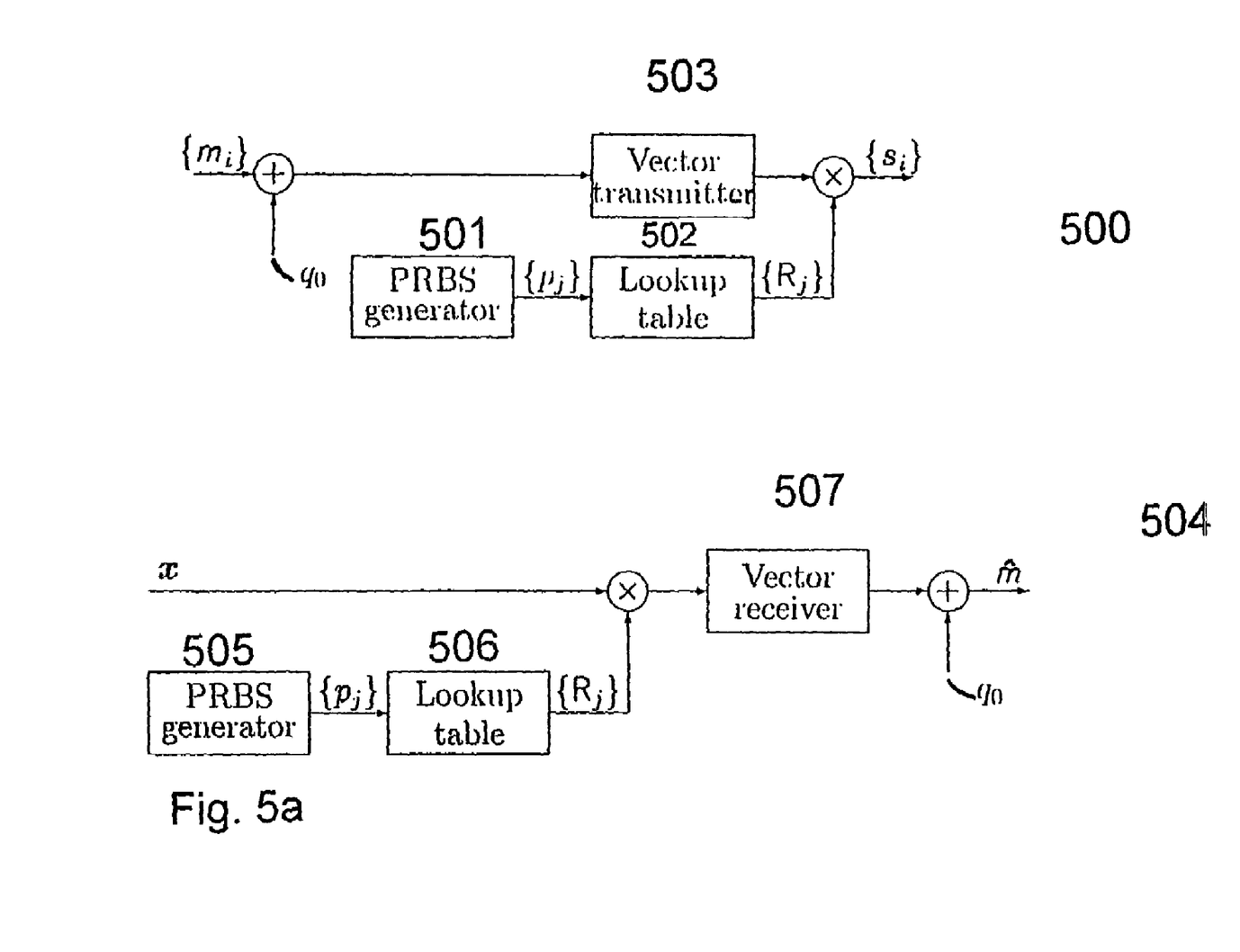
FIG. 5a is a schematic block diagram illustrating a transmitter and a receiver using transformation matrices wherein $m_0=0$ in accordance with a second preferred embodiment of the present invention.

In the following, the scrambling of the bit stream with the predefined symbols of Q is further described. In accordance with the present invention, Q is a subset of M. Q comprises symmetrically placed constellation points represented by $q_j$ from the symbol alphabet Q. The generated pseudo-random sequence must also be known at the receiver so that the mappings can be decoded by a receiver as shown in FIGS. 4a and 5a. The average energy per modulation interval for dummy data is then $$E_{dummy} = \frac{1}{\|Q\|} \sum_{j \in Q} E_j \qquad (2)$$

where Q denotes the number of elements in Q, giving a maximum power reduction ratio of $$r = \frac{E_{average}}{E_{dummy}} \qquad (3)$$

As an example, a 4-bit constellation as in the 16-QAM, i.e. M={0, 1, 2, ... 14, 15} of FIG. 2, with a power reduction subset of Q={0, 5, 10, 15} using equations 1, 2 and 3 gives a maximum power reduction ratio of r=5.

Figure 4B:
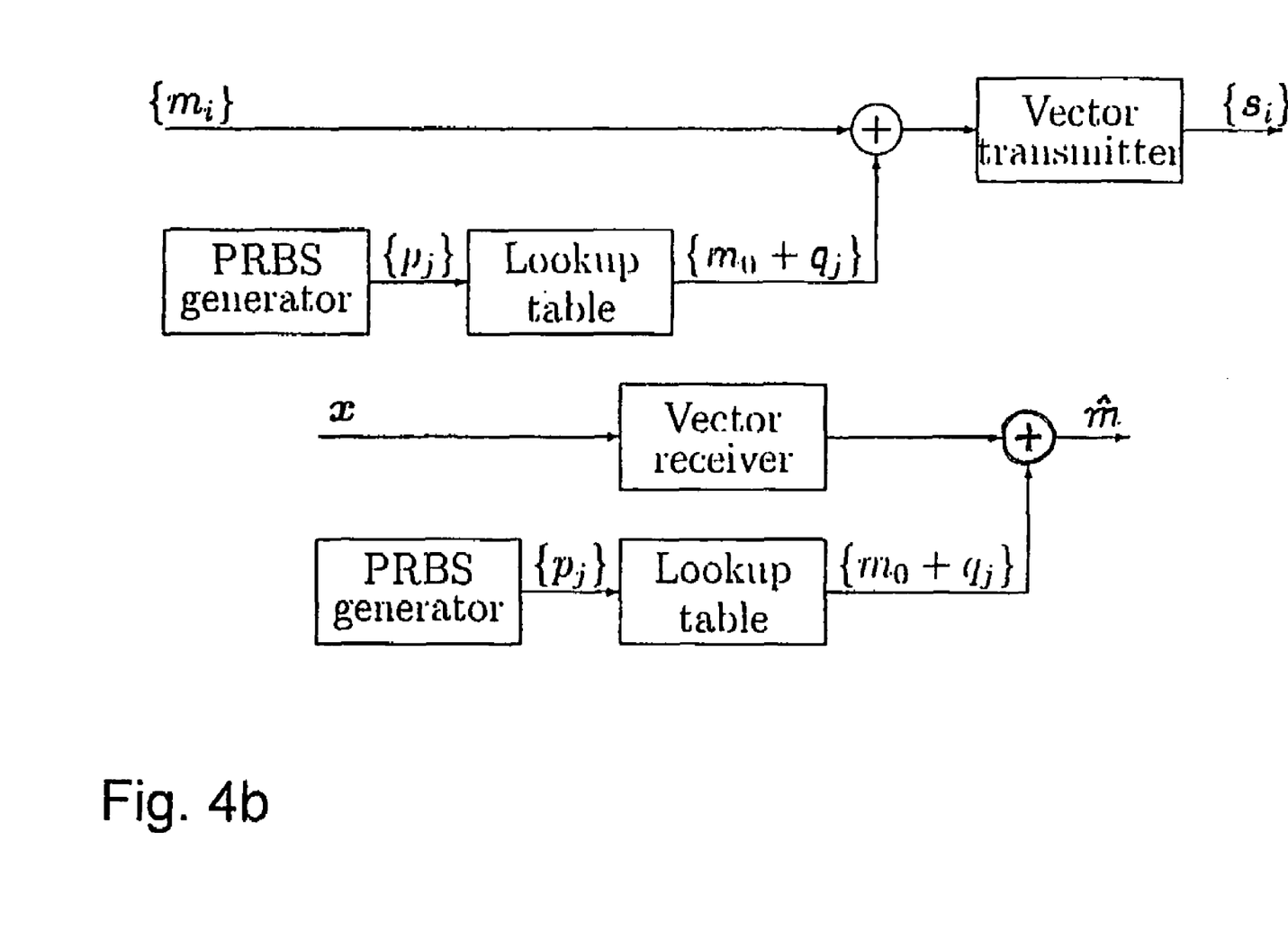
FIG. 4b is a schematic block diagram illustrating a transmitter and a receiver using bitwise modulo-2 addition wherein $m_0 \neq 0$ in accordance with a first embodiment of the present invention.

It should be noted that the illustration of the receiver and transmitter respectively is valid if $m_0$=0. In the general case, the look-up table comprises $m_0$+Q which results in that $m_0$+$q_j$ is generated from the look-up table by means of the PRBS generator as shown in FIG. 4b.

An advantage with the method of the first preferred embodiment is that it is very simple to implement.

A transmitter 500 and a receiver 504 in accordance with a second embodiment of the present invention is illustrated in FIG. 5a. It should be noted that the function of the PRBS generator 501, lookup table 502, vector transmitter 503 and vector receiver 507 respectively is similar to the function of the PRBS generator 401, lookup table 402, vector transmitter 403 and vector receiver 407 respectively of the first embodiment shown in FIG. 4a. In the second embodiment of the present invention, a mapping is performed by performing a modulo-2 addition between the modulated bit stream and a constant value $q_0$ from a second power reduction subset Q. The mapped bit stream are then transmitted to the vector transmitter 503. The output vector from the vector transmitter is then multiplied with one transformation matrixes Rj of a set of transformation matrixes Rj stored in a lookup table 506 shown in FIG. 5a. The transformation matrix Rj is randomly generated by a PRBS generator 505. In accordance with the present invention, each transformation matrix of FIG. 5a transforms Q 90 degrees. The direction of the 90 degree transformation is hence randomly determined by the PRBS generator. If the modulation method is QAM (N=2) and the vectors are represented by complex numbers, the set of transformation matrices degenerates to {1, i, −1, −i}. I.e. the result of the matrix multiplication, that is complex multiplication when the dimension is 2. In the QAM case, Q comprises 4 elements, $m_0$, $m_0$ turned 90 degrees, $m_0$ turned 180 degrees and $m_0$ turned 270 degrees.

Figure 5B:
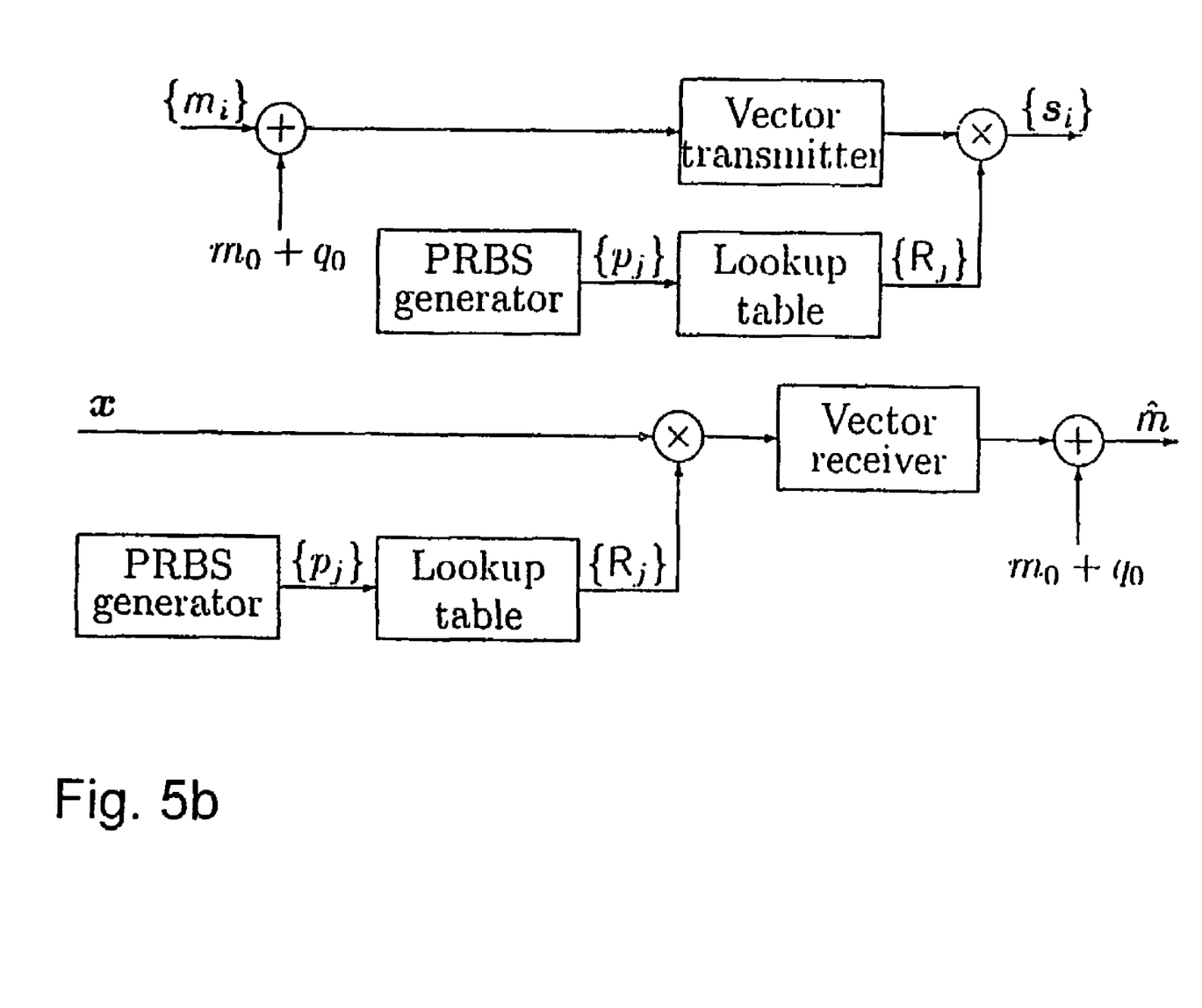
FIG. 5b is a schematic block diagram illustrating a transmitter and a receiver using transformation matrices $m_0 \neq 0$ in accordance with a second embodiment of the present invention.

It should be noted that the illustration of the receiver 504 and transmitter 500 respectively is valid if $m_0$=0. In the general case, the data symbols $m_i$ are scrambled with $m_0$+Q, which results in that $m_0$+$q_j$ is generated from the look-up table by means of the PRBS generator as shown in FIG. 5b.

Thus, the main idea with the present invention is to scramble a bit stream, represented by symbols from the symbol alphabet M, comprising user data and dummy data with randomly generated symbols from a predefined alphabet Q, in order to substantially reduce the transmit power when dummy data is sent in relation to the transmit power of the user data. Furthermore, Q is a subset of M.

Thus, Q is selected by performing the following steps:

Select a suitable reduction ratio, which determines a value of a desired $E_{dummy}$, since $E_{av}$ is known or possible to determine. See formula (3).

Determine a Q which results in a value close to the desired $E_{dummy}$.

Q comprises a number of message points, preferably four message points ($q_0$, $q_1$, $q_2$, $q_3$), lying symmetrically around the origin of the coordinates (0,0). The message points, e.g. the four message points ($q_0$, $q_1$, $q_2$, $q_3$), representing signal vectors ($s_0$, $s_1$, $x_2$, $s_3$), wherein the length of all of the signal vectors is equal, i.e., $\|s_0\|=\|s_1\|=\|s_2\|=\|s_3\|$ and the angle increment from $s_0$ to $s_1$, $s_1$ to $s_2$, $s_2$ to $s_3$ and $s_3$ to $s_0$, respectively is 90 degrees. Thus, for e.g. 8-QAM, 16-QAM and 32-QAM, Q comprises preferably the four innermost message points of M, when M is represented graphically as in FIG. 2.

The only practical choices of dummy data patterns that works for all sizes of symbol alphabets M is an all-zero or an all-one binary sequence, i.e. $m_0$ is consistently represented by zeros or ones. Here follows two examples of actual user data protocols with suggestions on how to randomize user data and how the dummy data should be mapped.

In ATM (Asynchronous Transfer Mode), user data (payload) should be randomized using the self-synchronizing scrambler polynomial x43+1 as described in the ITU-T recommendation I.432.1 and the dummy data, i.e. the idle cells, should be filled with the value 0x00.

Octet based HDLC (High-Level Data Link Control) has an inter-frame fill pattern of 0x7e octets. The transmitter and the receiver should bitwise modulo-2-add the value 0x7e to the data stream so that the inter-frame fill becomes an uninterrupted sequence of binary zeros.

Figure 6A:
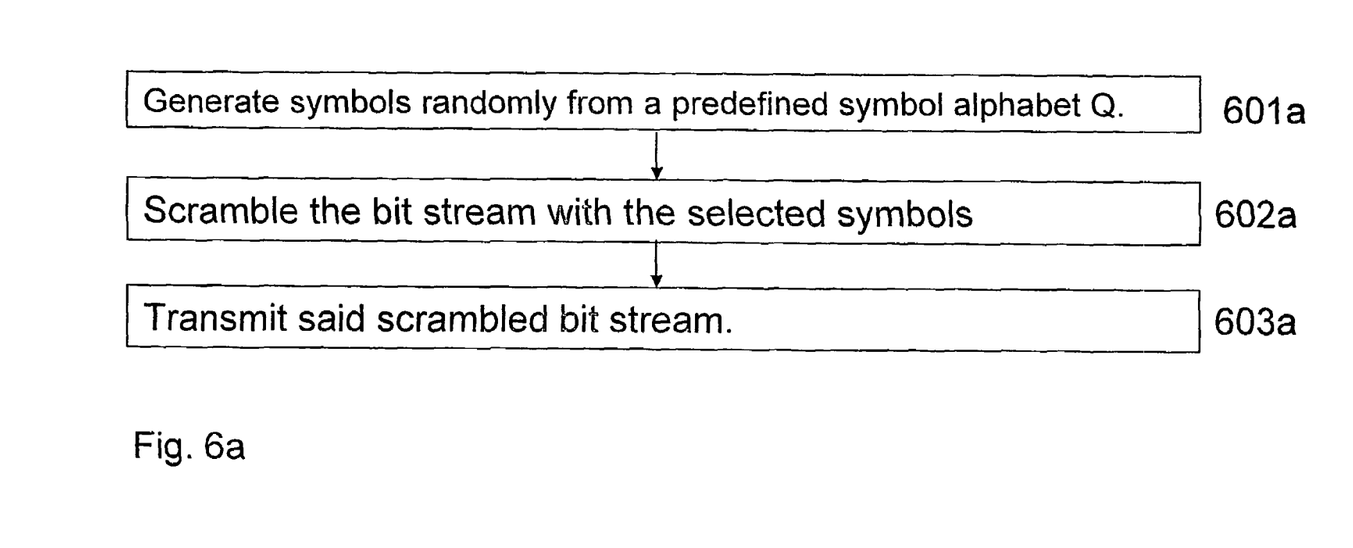
FIG. 6a shows a flowchart of a method for transmitting according to the present invention.

FIG. 6a shows a flowchart of a method in digital communication system for transmitting a modulated bit stream comprising user data and dummy data, according to the present invention in a general mode. The method comprises the following steps:

601a. Generate symbols randomly from a predefined symbol alphabet Q.

602a. Scramble the bit stream by performing bitwise modulo-2 addition between the modulated bit stream and the randomly generated symbols from Q. I.e. each bit of the bit stream is modulo-2 added with a randomly generated symbol from Q.

603a. Transmit said scrambled bit stream. The predefined symbol alphabet Q is a subset of M and defined so that the transmit power level of the dummy data is substantially lower than the transmit power level of the user data.

Figure 6B:
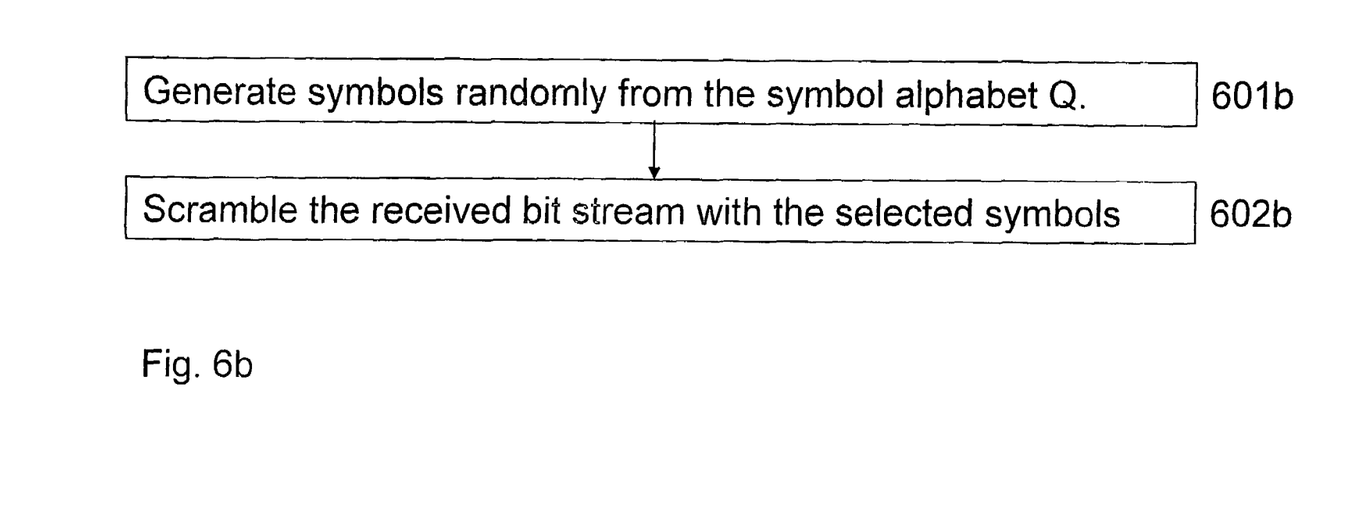
FIG. 6b shows a flowchart of a method for receiving according to the present invention.

FIG. 6b shows a flowchart of a method in a digital communication system for receiving a bit stream according to the present invention in a general mode. The bit stream is transmitted and scrambled in accordance with method illustrated in FIG. 6a. The method comprises the following steps:

601b. Generate in synchronisation with the transmitter of the received bit stream, symbols randomly from the symbol alphabet Q.

602b. Scramble the received bit stream in order to recreate estimated message symbols from symbol alphabet M by performing bitwise modulo-2 addition between the received bit stream and the randomly generated symbols from Q. I.e. each bit of the bit stream is modulo-2 added with a randomly generated symbol from Q The methods may be implemented by a computer program product directly loadable into the internal memory of a computer within a transmitter and/or receiver in a digital communication system, comprising the software code portions for performing the steps of said methods. The computer program product may be stored on a computer usable medium, comprising readable program for causing a computer, within a transmitter and/or receiver in a digital communication system, to control an execution of the steps of any of the said method.

From the above discussion it is evident that the solution according to the present invention can be accomplished by using other modulation techniques than QAM although the embodiments of the present invention are illustrated with QAM.

It should also be noted that if Automatic Gain Control (AGC) is used on the receiver side, a feedback from the vector receiver to the AGC is required to prevent the AGC to adjust the signal level when a signal with reduced power level enters the receiver.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a digital communication system for transmitting a modulated bit stream comprising modulated user data and modulated dummy data, wherein the modulated user data is represented by symbols from a symbol alphabet M, the modulated dummy data is represented by a symbol $m_0$, comprising:

(a)—generating (601a) symbols $q_0, \ldots, q_j$ randomly from a predefined symbol alphabet Q being a subset of the symbol alphabet M, (b)—scrambling (602a) the modulated bit stream by performing bitwise modulo-2 addition between the modulated bit stream and the randomly generated symbols $q_0, \ldots, q_j$ from Q, and (c)—transmitting (603a) said scrambled modulated bit stream, wherein the predefined symbol alphabet Q is defined so that the transmit power level of the dummy data is substantially lower than the transmit power level of the user data.

2. The method in a digital communication system for receiving a modulated bit stream wherein the modulated bit stream is transmitted and scrambled in accordance with claim 1, the method comprising the steps of:

(d)—generating (601b) symbols $q_0, \ldots, q_j$ randomly from the symbol alphabet Q in synchronisation with the transmitter of the received modulated bit stream, and (e)—scrambling (602b) the received modulated bit stream in order to recreate estimated message symbols from symbol alphabet M by performing bitwise modulo-2 addition between the received modulated bit stream and the randomly generated symbols $q_0, \ldots, q_j$ from Q.

3. The method according to claim 1, wherein the modulated bit stream is modulated with Quadrature Amplitude Modulation (QAM).

4. The method according to claim 3, wherein the QAM is 16-QAM.

5. The method according to claim 1, wherein Q comprises four message points $\{q_0, q_1, q_2, q_3\}$ representing signal vectors $\{s_0, s_1, s_2, s_3\}$, wherein the length of all of the signal vectors is equal, $\|s_0\|=\|s_1\|=\|s_2\|=\|s_3\|$ and the angle increments from $s_0$ to $s_1$, $s_1$ to $s_2$, $s_2$ to $s_3$ and $s_3$ to $s_0$ are 90 degrees.

6. The method according to claim 5, wherein Q comprises the four innermost message points of the symbol alphabet M.

7. The method according to claim 1, wherein the randomly generated symbols from Q is generated by applying a pseudo-random binary sequence generator to a lookup table wherein the symbol alphabet Q and $m_0$ are stored.

8. The method according to claim 1, wherein the modulated dummy data $m_0$ is consistently represented by zeros or consistently represented by ones.

9. The method according to claim 1, wherein the method is applied on Very high rate Digital Subscriber Line (VDSL).

10. A computer-readable medium directly loadable into the internal memory of a computer within a mobile station or a base station transceiver in a communication system, comprising the software code portions for performing the steps of claim 1.

11. A computer-readable medium comprising a readable program for causing a computer, within a mobile station or a base station transceiver in a communication system, to control an execution of the steps of claim 1.

12. A transmitter (400) in a digital communication system, comprising:
means for transmitting a modulated bit stream comprising modulated user data and modulated dummy data, the modulated user data being represented by symbols from a symbol alphabet M, the modulated dummy data being represented by a symbol $m_0$;
means (401, 402) for generating symbols $q_0, \ldots, q_j$ randomly from a predefined symbol alphabet Q being a subset of M;
means for scrambling the modulated bit stream by performing bitwise modulo-2 addition between the modulated bit stream and the randomly generated symbols $q_0, \ldots, q_j$ from Q; and
means for transmitting said scrambled modulated bit stream,
wherein the predefined symbol alphabet Q is defined so that a transmit power level of the dummy data is substantially lower than the transmit power level of the user data.

13. A receiver (404) in a digital telecommunication system comprising means for receiving a modulated bit stream wherein the modulated bit stream is transmitted and scrambled by the transmitter in accordance with claim 12, the receiver further comprises means (405,406) for in synchronisation with the transmitter (400) of the received modulated bit stream generating symbols $q_0, \ldots, q_j$ randomly from the symbol alphabet Q, and means for scrambling the received modulated bit stream by performing bitwise modulo-2 addition between the received modulated bit stream and the randomly generated symbols $q_0, \ldots, q_j$ from Q in order to recreate estimated message symbols from symbol alphabet M.

14. The transmitter (400) according to claim 12, wherein the modulated bit stream is modulated with Quadrature Amplitude Modulation (QAM)

15. The transmitter (400) according to claim 14, wherein the QAM is 16-QAM.

16. The transmitter (400) or receiver (404) according to claim 12, wherein Q comprises four message points $\{q_0, q_1, q_2, q_3\}$ representing signal vectors $\{s_0, s_1, s_2, s_3\}$ wherein the length of all of the signal vectors is equal, $\|s_0\|=\|s_1\|=\|s_2\|=\|s_3\|$ and the angle increments from $s_0$ to $s_1$, $s_1$ to $s_2$, $s_2$ to $s_3$ and $s_3$ to $s_0$ are 90 degrees.

17. The transmitter (400) according to claim 16, wherein Q comprises the four innermost message points of the symbol alphabet M.

18. The transmitter (400) according to claim 12, wherein the randomly generated symbols from Q is generated by applying a pseudo-random binary sequence generator (401; 405) to a lookup table (402;406) wherein the symbol alphabet Q and $m_0$ are stored.

19. The transmitter (400) according to claim 12, wherein the modulated dummy data $m_0$ is consistently represented by zeros or consistently represented by ones.

20. The transmitter (400) according to claim 12, wherein the transmitter (400) is applied on Very high rate Digital Subscriber Line (VDSL).

21. A transceiver in a digital communication system that comprises the transmitter according to claim 12.

22. The receiver according to claim 13, wherein the modulated bit stream is modulated with Quadrature Amplitude Modulation (QAM).

23. The receiver according to claim 22, wherein the QAM is 16-QAM.

24. The receiver according to claim 13, , wherein Q comprises four message points $\{q_0, q_1, q_2, q_3\}$ representing signal vectors $\{s_0, s_1, s_2, s_3\}$, wherein the length of all of the signal vectors is equal, $\|s_0\|=\|s_1\|=\|s_2\|=\|s_3\|$ and the angle increments from $s_0$ to $s_1$, $s_1$ to $s_2$, $s_2$ to $s_3$ and $s_3$ to $s_0$ are 90 degrees.

25. The receiver according to claim 24, wherein Q comprises the four innermost message points of the symbol alphabet M.

26. The receiver according to claim 13, wherein the randomly generated symbols from Q is generated by applying a pseudo-random binary sequence generator (401;405) to a lookup table (402;406) wherein the symbol alphabet Q and $m_0$ are stored.

27. The receiver according to claim 13, wherein the modulated dummy data $m_0$ is consistently represented by zeros or consistently represented by ones.

28. The receiver according to claim 13, wherein the transmitter (400) or receiver (404) is applied on Very high rate Digital Subscriber Line (VDSL).

29. A transceiver in a digital communication system, comprising the receiver according to claim 13.

* * * * *

UNITED STATES PATENT AND TRADEMARK OFFICE
CERTIFICATE OF CORRECTION

PATENT NO. : 7,672,392 B2
APPLICATION NO. : 10/549449
DATED : March 2, 2010
INVENTOR(S) : Johansson It is certified that error appears in the above-identified patent and that said Letters Patent is hereby corrected as shown below:

In Column 1, Line 32, delete "S$_i$(t)" and insert -- s$_i$(t) --, therefor.

In Column 1, Line 60, in Equation (1), delete " $E_{av} = \frac{1}{\|M\|} \sum_{i=0}^{\|M\|-1} E_i =$ " and insert -- $E_{av} = \frac{1}{\|M\|} \sum_{i=0}^{\|M\|-1} E_i$ --, therefor.

In Column 5, Line 55, delete " $\hat{m}_{N-1}$, " and insert -- $\hat{m}_{N-1}$. --, therefor.

In Column 7, Line 11, delete "x$_2$," and insert -- s$_2$, --, therefor.

In Column 9, Line 52, in Claim 14, delete "(QAM)" and insert -- (QAM). --, therefor.

In Column 10, Line 3, in Claim 16, after "(400)", delete "or receiver (404)".

In Column 10, Line 5, in Claim 16, delete "s$_3$}" and insert -- s$_3$}, --, therefor.

In Column 10, Line 30, in Claim 24, delete "13, ," and insert -- 13, --, therefor.

Signed and Sealed this

Twenty-second Day of June, 2010

David J. Kappos
*Director of the United States Patent and Trademark Office*